(12) United States Patent
Le Mer et al.

(10) Patent No.: US 11,012,977 B2
(45) Date of Patent: May 18, 2021

(54) METHOD FOR PROVIDING INFORMATION TO AND METHOD FOR BROADCASTING TO A COMMUNICATION TERMINAL OF A USER, INFORMATION MANAGER AND BROADCASTER

(71) Applicant: ORANGE, Paris (FR)

(72) Inventors: Pascal Le Mer, Perros Guirec (FR); Cedric Seureau, Lannion (FR); Christian Gregoire, Trebeurden (FR); Mariano Belaunde, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/016,146

(22) Filed: Jun. 22, 2018

(65) Prior Publication Data
US 2018/0376455 A1  Dec. 27, 2018

(30) Foreign Application Priority Data
Jun. 23, 2017 (FR) ...................................... 1755798

(51) Int. Cl.
*H04W 4/00* (2018.01)
*H04W 72/00* (2009.01)
(Continued)

(52) U.S. Cl.
CPC .......... *H04W 72/005* (2013.01); *H04L 67/12* (2013.01); *H04L 67/22* (2013.01); *H04L 67/26* (2013.01);
(Continued)

(58) Field of Classification Search
USPC ................................................ 370/312, 464
See application file for complete search history.

(56) References Cited

U.S. PATENT DOCUMENTS

2005/0198063 A1   9/2005  Thomas et al.
2011/0187928 A1*  8/2011  Crabtree ................ G05B 23/02
                                                              348/553

FOREIGN PATENT DOCUMENTS

EP         2093967 A2    8/2009

OTHER PUBLICATIONS

English Translation of French Search Report dated Mar. 19, 2018 for corresponding French Application No. 1755798, filed on Jun. 23, 2017.

(Continued)

*Primary Examiner* — Phuongchau Ba Nguyen
(74) *Attorney, Agent, or Firm* — David D. Brush; Westman, Champlin & Koehler, P.A.

(57) ABSTRACT

A method for providing information to a communication terminal of a user, a method for broadcasting to the terminal, and an information manager and broadcaster using the methods. The information is based on data relating to at least one object connected to a communication network, such as the Internet. The information-providing method includes selecting a broadcasting channel depending on whether the broadcasting channel is being actively used by the communication terminal of the destination user, the broadcasting channel being able to broadcast, to the at least one communication terminal of the user, a piece of information generated on the basis of at least one datum originating from at least one connected object associated with the user. Thus, the data originating from the connected object(s) allow the user to be informed in a pertinent, personalized and unintrusive way.

17 Claims, 4 Drawing Sheets

(51) Int. Cl.
*H04L 29/08* (2006.01)
*H04W 24/02* (2009.01)
*H04W 72/02* (2009.01)

(52) U.S. Cl.
CPC ......... *H04L 67/2823* (2013.01); *H04W 24/02* (2013.01); *H04W 72/02* (2013.01)

(56) References Cited

OTHER PUBLICATIONS

English Translation of French Written Opinion dated Mar. 19, 2018 for corresponding French Application No. 1755798, filed on Jun. 23, 2017.
French Search Report dated Mar. 19, 2018 for corresponding French Application No. 1755798, filed on Jun. 23, 2017.
French Written Opinion dated Mar. 19, 2018 for corresponding French Application No. 1755798, filed on Jun. 23, 2017.

* cited by examiner

METHOD FOR PROVIDING INFORMATION TO AND METHOD FOR BROADCASTING TO A COMMUNICATION TERMINAL OF A USER, INFORMATION MANAGER AND BROADCASTER

CROSS-REFERENCE TO RELATED APPLICATIONS

This Application claims priority to and the benefit of French Patent Application No. FR 1755798, filed Jun. 23, 2017, the content of which is incorporated herein by reference in its entirety.

FIELD OF THE DISCLOSURE

The present disclosure relates to a method for providing information to and a method for broadcasting to a communication terminal of a user, said information being based on data relating to at least one object connected to a communication network, such as the Internet, and also relates to the information manager and broadcaster using said methods.

BACKGROUND OF THE DISCLOSURE

The field of connected objects is growing rapidly. Multiple connected objects are becoming part of our everyday lives: our houses (home automation: thermostat, openable fixtures, etc., monitoring: weather station, detector, etc.), our personal space (watch, weighing scale, etc.), our environment, etc.

Home automation solutions such as Orange Homelive (registered trademark) deliver information via asynchronous communication channels such as SMS or email. These solutions have, by way of drawback, in particular the fact that the user always receives the information over the same communication channel, for example an SMS sent to the same telephone number irrespective of whether the user is in a meeting, in the process of consulting his SMSs, in the process of watching a film on his television set, etc. For this reason, the transmitted piece of information is not always used correctly since it is not read, or it is read subsequently to the moment when the information is most relevant, or because it is obsolete, or because the situation has changed. For example, an alarm transmitted, in particular via the SMS channel, requires the user to stop what he is currently doing in order to turn his attention to a new medium (the SMS on his cell phone).

SUMMARY

One of the aims of one or more embodiments of the present disclosure is to provide improvements with respect to the prior art.

One subject of the present disclosure is a method for providing information to a user of a communication terminal, said information being based on data relating to at least one object connected to a communication network. The information-providing method includes selecting a broadcasting channel depending on whether the broadcasting channel is being actively used by the communication terminal of the destination user, the broadcasting channel being able to broadcast, to at least one communication terminal of the user, a piece of information generated on the basis of at least one datum originating from at least one connected object associated with the user.

Thus, the data originating from the connected object(s) allow the user to be informed in a pertinent, personalized and unintrusive way.

Advantageously, the information-providing method includes analyzing the behavior of the destination user, the analyzed behavior being used, by the selection, to determine whether one or more broadcasting channels are being actively used by the user.

Thus, the data originating from the connected object(s) allow a pertinent piece of information to be provided because said information is not simply present in the environment of the user but broadcast over a broadcasting channel that it is known is being actively used by the user.

Advantageously, the information-providing method includes predicting, depending on at least one behavior of the user, whether a broadcasting channel will be being actively used by the user at a given time at which the generated piece of information is to be broadcast.

Thus, for data for which the transmission is programmed, i.e. for data that are not transmitted in real time but at a given time of the day, week, etc., once again, the data originating from one or more connected objects will allow a pertinent piece of information to be provided because said information will not simply be present in the environment of the user at this time but broadcast over a broadcasting channel that it is known is expected to be being actively used by the user at this time.

Advantageously, the information-providing method includes generating a piece of information to be broadcast depending:

on at least one datum originating from at least one connected object; and on the behavior of and/or a request by the destination user.

Thus, the data originating from one or more connected objects are transmitted to the user in a form that is usable by the user or another communication device of the user, in particular in the form of a personalized piece of information. In this way, the risk that the data are treated as background noise by the user, i.e. that they form part of the very many pieces of useful information and data transmitted to a user and that are never read and/or used, is decreased.

Advantageously, the information-providing method includes integrating the generated piece of information into useful data of a signal transmitted via the selected broadcasting channel.

Thus, the information is not broadcast and reproduced as an additional piece of information but with the useful data of the signal, i.e. with the audio and/or video content of a radio or TV signal, and not in the form of an additional piece of information displayed on a radio or on top of a TV image, thus increasing the likelihood that the piece of information will be used by the user.

Advantageously, the information-providing method includes converting the generated piece of information into a format compatible with the selected broadcasting channel, the resulting converted piece of information being able to be integrated into useful data of a signal in the process of being broadcast.

Thus, the integration into the useful data is facilitated.

One subject of the present disclosure is also a method for broadcasting, to a communication terminal of a user, a signal based on data relating to at least one object connected to a communication network, the broadcasting method including broadcasting a piece of information generated on the basis of at least one datum originating from at least one connected object to at least one communication terminal of the user over a broadcasting channel that is selected depending on whether the broadcasting channel is being actively used by the communication terminal of the destination user.

Advantageously, the broadcasting method includes integrating the generated piece of information into useful data of a signal transmitted via the selected broadcasting channel.

Advantageously, the integration includes at least one of the following steps:
- adding the generated piece of information to useful data of the signal;
- in at least one predefined time range, substituting the generated piece of information for useful data of the signal;
- substituting the generated piece of information for predefined useful data of the signal.

Thus, in the case of addition, the piece of information is included in the useful data, in particular the multimedia content, broadcast then reproduced for the user, without any modification of the multimedia content and in particular without deletion of content (in particular publicity, games, etc.) for which the content provider is paid, nor deletion of some or the entirety of the content that the user is interested in.

In the case of substitution, any type of content may be substituted, at least in the time required to broadcast the generated piece of information. Optionally the generated piece of information may be repeated immediately or subsequently, optionally at regular intervals, for a preset period. Thus, the generated piece of information will possibly be reproduced for the user every quarter of an hour for one hour or every hour for half a day or a day, provided that the user is still actively using the broadcasting channel, in order to ensure the user is actually informed.

Advantageously, the broadcasting method includes converting the generated piece of information into a format compatible with the selected broadcasting channel, the resulting converted piece of information being able to be integrated into useful data of a signal in the process of being broadcast.

Advantageously, the broadcasting channel is a broadcasting channel of at least one of the following types:
- a radio broadcasting channel;
- a television broadcasting channel;
- an instant-message broadcasting channel;
- a broadcasting channel dedicated to the broadcast of at least one piece of information generated on the basis of data relating to a connected object.

Thus, various types of terminals may receive the generated piece of information: smartphone, computer, TV and/or IP radio for the radio channel; smartphone, computer and/or IP TV for the TV channel, smartphone and/or computer for the instant-message broadcast.

In the case of instant messages, the generated piece of information is broadcast by means of a chatbot in particular after conversion into text. Thus, a user using a communication terminal to navigate the web will possibly thus receive, in his web window, the generated piece of information in the form of an instant message, the selected broadcast channel being the channel used to transmit the data of the Internet page that is in the process of being consulted.

Advantageously, according to one implementation, the various steps of the method according to the present disclosure are implemented by a software package or computer program, this software package comprising software instructions that are intended to be executed by a data processor of a device forming part of a server for managing connected objects and/or of a broadcasting server, and being designed to control the execution of the various steps of this method.

The present disclosure therefore also relates to a program comprising program-code instructions for executing steps of the information-providing method and/or steps of a broadcasting method when said program is executed by a processor.

This program may use any programming language and take the form of source code, object code or code that is intermediate between source code and object code, such as code in a partially compiled form or any other desirable form.

One subject of the present disclosure is also a manager of the information provided to a user of a communication terminal depending on data relating to at least one object connected to a communication network, the information manager including at least one broadcasting-channel selector, the selector choosing a broadcasting channel depending on whether the broadcasting channel is being actively used by a communication terminal of a destination user, the broadcasting channel being able to broadcast, to at least one communication terminal of the user, a piece of information generated on the basis of at least one datum originating from at least one connected object.

Advantageously, a connected-object manager includes:
- a receiver of data originating from at least one object connected to a communication network; and
- an information manager according to an exemplary aspect of the present disclosure.

One subject of the present disclosure is also a broadcaster of multimedia data to at least one communication terminal of a user, the broadcaster including an emitter for emitting, over a selected broadcasting channel, to at least one communication terminal of a user, a signal intended to be transmitted by the selected broadcasting channel, into which signal is integrated a piece of information generated on the basis of at least one datum originating from at least one connected object, the broadcasting channel having been selected depending on whether the broadcasting channel is being actively used by a communication terminal of a destination user.

BRIEF DESCRIPTION OF THE DRAWINGS

Features and advantages of one or more subject s of the present disclosure will become more clearly apparent on reading the description, which is given by way of example, and the figures that relate thereto, which show:

FIG. 3a, a simplified schematic illustrating a network of domestic connected objects, which network is used by one embodiment of the disclosure;

FIG. 3b, a simplified schematic of one embodiment of a user interface with an aspect of the disclosure;

FIG. 3c, a simplified schematic of a piece of radio-broadcast information;

FIG. 3d, a simplified schematic of a piece of TV-broadcast information;

FIG. 3e, a simplified schematic of a piece of information broadcast via instant message.

DETAILED DESCRIPTION OF ILLUSTRATIVE EMBODIMENTS

Figure 1:
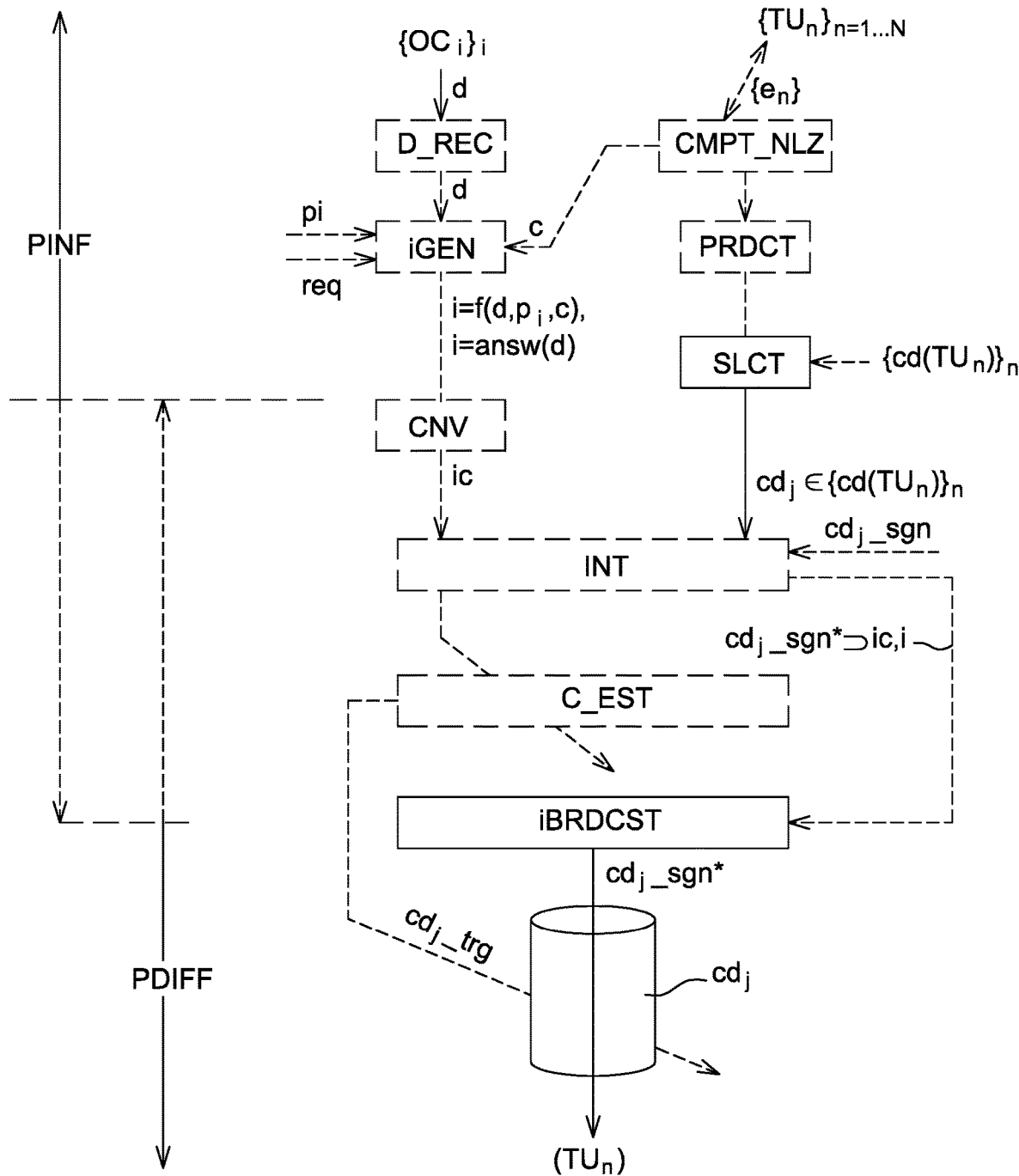
FIG. 1, a simplified schematic of information-providing and broadcasting methods according to an exemplary aspect of the present disclosure.

FIG. 1 illustrates a simplified schematic of information-providing and broadcasting methods according to an exemplary aspect of the present disclosure.

The method PINF for providing a user of a communication terminal with information is such that the piece of information i is based on data d relating to at least one object $OC_i$ connected to a communication network. The information-providing method PINF includes selecting SLCT a broadcasting channel $cd_j$ depending on whether the broadcasting channel is being actively used by a terminal $TU_n$ of a destination user U. The broadcasting channel $cd_j$ is able to broadcast, to at least one communication terminal $TU_n$ of the user, a piece of information i generated on the basis of at least one datum d originating from at least one connected object $OC_i$ associated with the user U.

In particular, the information-providing method PINF includes analyzing CMPT_NLZ the behavior of the destination user U. The analyzed behavior c is used by the selection SLCT to determine whether one or more broadcasting channels $cd_j$ will be being actively used by the user U.

The expression "broadcasting channel being actively used" is understood to mean that a communication terminal of the user not only receives the broadcasting channel and reproduces the useful data carried by the signal transmitted using this broadcasting channel, but also that the user is "paying attention to" the channel.

In particular, an organizer stored in a communication terminal or in a networked device associated with the user and/or location and/or contactability information delivered by a communication terminal of the user make it possible to determine whether a broadcasting channel received by a communication terminal of the user is being actively used. For example, to determine how the channel is being used, the organizer of the user is searched to determine whether the user is in a meeting, or occupied, or it is determined whether the communication terminal is being used by the user to communicate with a third party: telephone call, video communication, conference call, etc.

A behavior of the user, such as regular viewing of a given broadcasting channel in a specific time range with a specific communication terminal, makes it possible to determine whether this broadcasting channel will be being actively used in this time range.

In one embodiment, a sensor, such as a video camera of a communication terminal, makes it possible to determine whether the user of the communication terminal is paying attention to a broadcasting channel to which the communication terminal is connected.

In particular, the information-providing method includes predicting PRRDCT, depending on at least one behavior c of the user, whether a broadcasting channel $cd_j$ will be being actively used by the user U at a given time t at which the generated piece of information i is to be broadcast.

In particular, the information-providing method PINF includes generating IGEN a piece of information i to be broadcast depending:
on at least one datum originating from at least one connected object; and
on the behavior c:i=f(d, pi, c) of and/or a request req by the destination user: i=answ(d).

In particular, the information-providing method PINF includes receiving D_REC data d originating from at least one connected object $OC_i$. The generation IGEN uses at least some of the data d received via the reception D_REC.

In particular, the information-providing method PINF include integrating INT the generated piece of information i into useful data of a signal $cd_j\_sgn$ transmitted via the selected broadcasting channel. The information-providing method PINF in particular includes broadcasting IBRDCST over the selected broadcasting channel $cd_j$ a signal into which is integrated the piece of information i generated on the basis of data d relating to at least one connected object $OC_i$.

In particular, the information-providing method PINF includes converting CNV the generated piece of information i into a format that is compatible with the selected broadcasting channel, the resulting converted piece of information is being able to be integrated INT into useful data of a signal $cd_j\_sgn$ in the process of being broadcast. The information-providing method PINF in particular includes broadcasting IBRDCST over the selected broadcasting channel $cd_j$ a signal in which the integrated piece of information is a piece of information is that is generated on the basis of data d relating to at least one connected object $OC_i$, and that is converted into a format that is compatible with the selected broadcasting channel.

In particular, in the case where the broadcasting channel is an instant-message broadcasting channel or in the case where the behavioral analysis CMPT_NLZ determines that the user is available to pay attention to a specific TV/radio broadcasting channel that delivers at least one piece of information (i.e. a radio of my connected objects, or a television of my connected objects, for example), the information-providing method PINF may include opening C_EST the selected broadcasting channel cd prior to the broadcast IBRCST.

A method PDIFF for broadcasting to a communication terminal $TU_n$ of a user broadcasts a signal $cd_j\_sgn^*$ based on data d relating to at least one object $OC_i$ connected to a communication network. The broadcasting method PDIFF includes broadcasting iBRDCST a piece of information i generated on the basis of at least one datum d originating from at least one connected object $OC_i$ to at least one communication terminal $TU_n$ of the user over a broadcasting channel $cd_j$ that is selected depending on whether the broadcasting channel $cd_j$ is being actively used by the communication terminal of the destination user $TU_n$.

In particular, the broadcasting method PDIFF includes integrating INT the generated piece of information i into useful data of a signal $cd_j\_sgn$ transmitted via the selected broadcasting channel. The broadcasting method PDIFF in particular includes broadcasting IBRDCST, over the selected broadcasting channel $cd_j$, a signal in which the integrated piece of information is the piece of information i generated on the basis of data d relating to at least one connected object $OC_i$.

In particular, the integration INT includes at least one of the following steps:
adding ADD the generated piece of information i to useful data of the signal $cd_j\_sgn$;
in at least one predefined time range, substituting Δ_SUBST the generated piece of information i for useful data of the signal $cd_j\_sgn$;
substituting DU_SUBST the generated piece of information i for predefined useful data of the signal $cd_j\_sgn$.

In particular, the broadcasting method DIFF includes converting CNV the generated piece of information i into a format that is compatible with the selected broadcasting channel, the resulting converted piece of information ic being able to be integrated INT into useful data of a signal $cd_j$_sgn in the process of being broadcast. The broadcasting method PDIFF in particular includes broadcasting IBRDCST over the selected broadcasting channel $cd_j$ a signal in which the integrated piece of information is a piece of information ic that is generated on the basis of data d relating to at least one connected object $OC_i$, and that is converted into a format that is compatible with the selected broadcasting channel.

In particular, in the case where the broadcasting channel is an instant-message broadcasting channel or in the case where the behavioral analysis CMPT_NLZ determines that the user is available to pay attention to a specific TV/radio broadcasting channel that delivers at least one piece of information (i.e. a radio of my connected objects, or a television of my connected objects, for example), the broadcasting method PDIFF may include opening C_EST the selected broadcasting channel cd prior to the broadcast IBRCST.

In particular, the broadcasting channel cd is a broadcasting channel of at least one of the following types:
  a radio broadcasting channel;
  a television broadcasting channel;
  an instant-message broadcasting channel;
  a broadcasting channel dedicated to the broadcast of at least one piece of information generated on the basis of data relating to a connected object.

In various particular embodiments:
  one or more of the following steps are implemented in the information-providing method PINF:
  a step of receiving D_REC data originating from connected objects;
  a step of generating IGEN information on the basis of data d received from connected objects and in particular delivered by the data reception D_REC;
  a step of analyzing CMPT_NLZ the behavior of a user, in particular depending on at least one state $\{e_n\}$ of at least one communication terminal $\{TUn\}_n$ of a user or of at least one processing device of at least one communication terminal $\{TUn\}_n$ (for example a processing device is one or more of the following devices: a video camera, accelerometers, an electronic organizer, etc.), the behavioral analysis CMPT_NLZ making it possible to determine a behavior c of the user to be and/or to determine at least one broadcasting channel to which one of the communication terminals of the user is connected, and that is being actively used by the user $cd_j$;
  a step of predicting PRDCT, this step using behaviors c of the user with regard to at least one communication terminal $\{TUn\}_n$ of the user to estimate, at a preset time and/or in a preset time range, a behavior c' of the user with regard to a communication terminal and/or to at least one broadcasting channel to which one of the communication terminals of the user is connected; and
  a step of selecting SLCT a broadcasting channel $cd_j$ depending on whether the broadcasting channel is being actively used, in particular on the basis of the behaviors c determined by the behavioral analysis CMPT_NLZ or the prediction PRDCT;
  one or more of the following steps are implemented in the information-providing method or the broadcasting method:
  a step of converting CNV a piece of generated information i, in particular the piece of information i delivered by the generation IGEN, on the basis of data d received from connected objects, and in particular the data delivered by the reception D_REC;
  a step of integrating INT into a signal $cd_j$_sgn to be transmitted over the selected broadcasting channel $cd_j$, in particular resulting from the selection SLCT, a piece of information i, ic generated on the basis of data relating to connected objects associated with the user, in particular the piece of information i delivered by the generation IGEN or the converted piece of information ic delivered by the conversion CNV;
  a step of opening or establishing a broadcasting channel C_EST with a communication terminal of the user TUn, in particular the broadcasting channel $cd_j$ selected by the selection SLCT of the information-providing method PINF; and
  the following step is implemented in the broadcasting method PDIFF:
  a step of broadcasting IBRDCST a signal integrating a piece of information i, ic generated on the basis of data relating to connected objects associated with the user, in particular the piece of information i delivered by the generation IGEN or the converted piece of information ic delivered by the conversion CNV.

One embodiment of the information-providing method and/or of the broadcasting method is a program comprising program-code instructions for executing steps of the information-providing method and/or steps of a broadcasting method when said program is executed by a processor.

Figure 2:
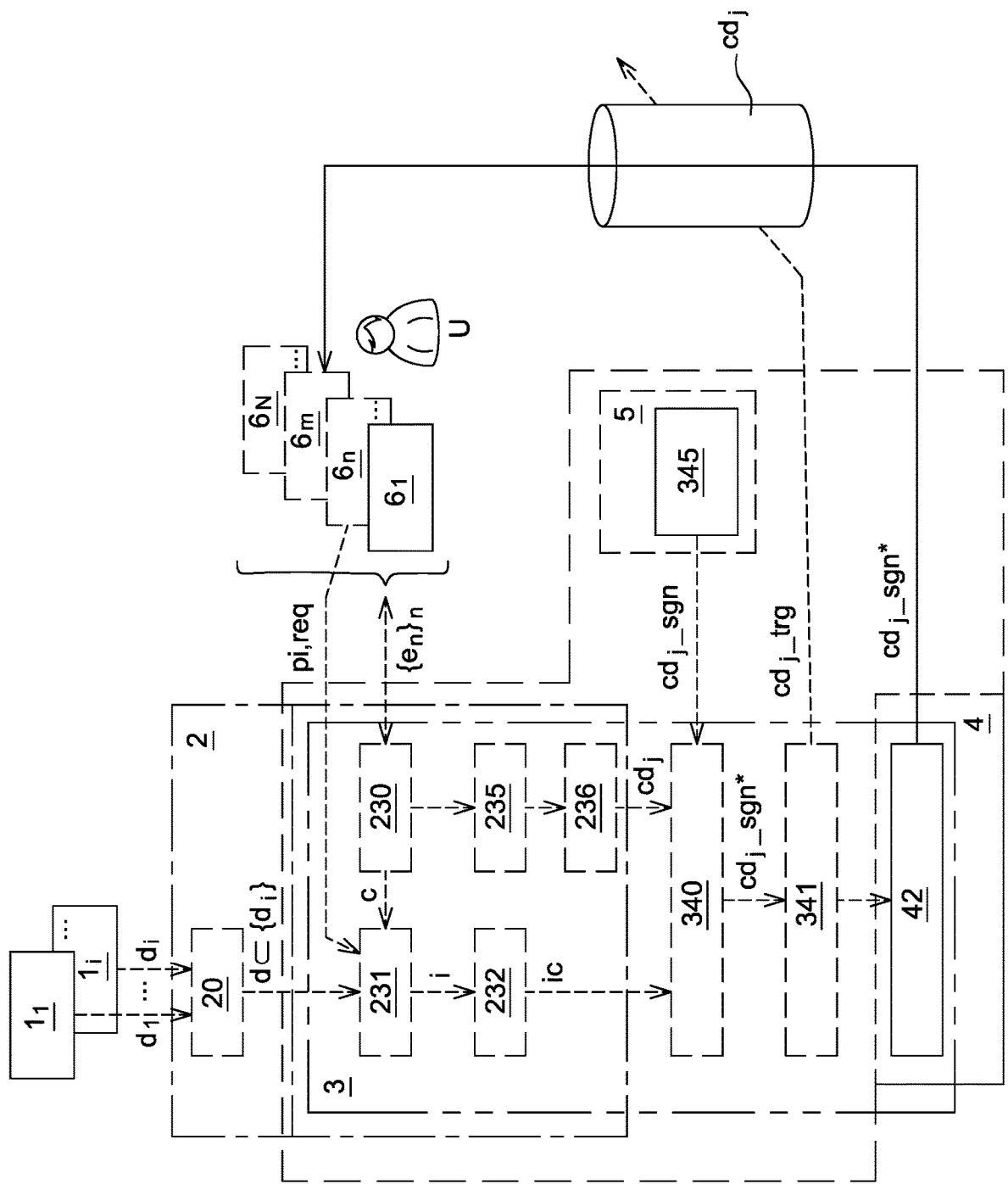
FIG. 2, a communication architecture including an information manager and a broadcaster according to an exemplary aspect of the present disclosure.

FIG. 2 illustrates a communication architecture including an information manager and a broadcaster according to an exemplary aspect of the present disclosure.

At least one connected object $1_1 \ldots 1i$ associated with a user delivers data $d_1 \ldots di$ via a communication network to at least one connected-object manager 2. In one particular embodiment, the connected-object manager and at least some of the connected objects are co-located, for example in the home of the user, the communication network then being a local network for the co-located connected objects, and a remote network such as the Internet for the other connected objects. In another embodiment, the manager of connected objects is remote from the connected objects: they are then connected via a remote network such as the Internet. In this case, the connected-object manager is in particular a device implemented in the cloud. The objects connected via the Internet are connected to the Internet in particular by way of a low-power wireless network such as a LoRa network, a SigFox network, etc. (registered trademarks).

In in particular, a connected-object manager 2 includes a receiver 20 that is connected to a communication network connecting it to one or more connected objects $1_1 \ldots 1i$. Thus, the receiver 20 receives data $d_1 \ldots di$ from the connected objects $1_1 \ldots 1i$.

The architecture includes a manager 3 of the information provided to a user of a communication terminal $6_1 \ldots 6_N$ depending on data $d_1 \ldots di$ relating to at least one object $1_1 \ldots 1i$ connected to a communication network. The information manager 3 includes at least one broadcasting-channel selector 236. The selector 236 chooses a broadcasting channel $cd_j$ depending on whether the broadcasting channel is being actively used by a communication terminal $6_1 \ldots 6_N$ of a destination user. The broadcasting channel $cd_j$ is able to broadcast a piece of information i generated on the basis of at least one datum $d_1 \ldots di$ originating from at least one connected object $1_1 \ldots 1i$ to at least one communication terminal $6_1 \ldots 6_N$ of the user. The destination user is associated with the connected objects $1_1 \ldots 1i$ delivering the data on the basis of which the piece of information i to be broadcast is generated.

In particular, the information manager 3 includes an analyzer 230 of the behavior of the destination user U. The analyzed behavior c is used by the selector 236 to determine whether one or more broadcasting channels $cd_j$ are being actively used by the user U.

In particular, the information manager 3 includes a predictor 235 of whether a broadcasting channel $cd_j$ will be being actively used by the user U at a given time t at which the piece of information i generated depending on at least one behavior c of the user is to be broadcast.

In particular, the information manager 3 includes a generator 231 of a piece of information i to be broadcast depending:
  on at least one datum originating from at least one connected object $1_1 \ldots 1i$; and
  on the behavior c of and/or a request by the destination user.

In particular, the information manager 3 includes an integrator 240 or a composite-signal generator that integrates the generated piece of information i into useful data of a signal $cd_{j\_}sgn$ transmitted via the selected broadcasting channel. The information manager 3 or a broadcaster 4 in particular includes means 42 for broadcasting, over the selected broadcasting channel $cd_j$, a signal in which the integrated piece of information is the information i generated on the basis of data d relating to at least one connected object $OC_i$.

In particular, the information manager 3 includes a converter 232 for converting the generated piece of information i into a format that is compatible with the selected broadcasting channel, the resulting converted piece of information ic being delivered to the integrator 340, which integrates it into useful data of a signal $cd_{j\_}sgn$ in the process of being broadcast. The information manager 3 or a broadcaster 4 in particular includes an emitter 42 for emitting, over the selected broadcasting channel $cd_j$, a signal in which the integrated piece of information is a piece of information ic that is generated on the basis of data d relating to at least one connected object $OC_i$, and that is converted into a format that is compatible with the selected broadcasting channel.

In particular, the information manager 3 or the broadcaster 4 may include a device 341 for establishing the selected broadcasting channel $cd_j$ prior to the broadcast IBRCST.

In particular, the broadcaster 4 includes an integrator 340 for integrating the generated piece of information i into useful data of a signal $cd_{j\_}sgn$ transmitted via the selected broadcasting channel. The broadcaster 4 in particular includes an emitter 42 for emitting, over the selected broadcasting channel $cd_j$, a signal in which the integrated piece of information is the piece of information i generated on the basis of data d relating to at least one connected object $OC_i$.

In particular, the integrator 340 includes at least one of the following means:
  an adder (not illustrated) for adding the generated piece of information i to the useful data of the signal $cd_{j\_}sgn$;
  a first switch (not illustrated) for substituting, in at least one predefined time range, the generated piece of information i for useful data of the signal $cd_{j\_}sgn$; and
  a second switch (not illustrated) for substituting the generated piece of information i for predefined useful data of the signal $cd_{j\_}sgn$.

In particular, the broadcaster 4 includes the converter 232 for converting the generated piece of information i into a format that is compatible with the selected broadcasting channel, the resulting converted piece of information ic being able to be integrated INT into useful data of a signal $cd_{j\_}sgn$ in the process of being broadcast. The broadcaster 4 in particular includes an emitter 42 for emitting, over the selected broadcasting channel $cd_j$, a signal in which the integrated piece of information is a piece of information ic that is generated on the basis of data d relating to at least one connected object $OC_i$, and that is converted into a format that is compatible with the selected broadcasting channel.

In particular, in the case where the broadcasting channel is an instant-message broadcasting channel or in the case where the behavior analyzer 230 determines that the user is available to pay attention to a specific TV/radio broadcasting channel that delivers at least one piece of information (i.e. a radio of my connected objects, or a television of my connected objects, for example), the broadcaster 4 may include an establishing device 341 allowing the selected broadcasting channel $cd_j$ to be established prior to a broadcast over this channel.

In particular, the broadcasting channel cd is a broadcasting channel of at least one of the following types:
  a radio broadcasting channel;
  a television broadcasting channel;
  an instant-message broadcasting channel;
  a broadcasting channel dedicated to the broadcast of at least one piece of information generated on the basis of data relating to a connected object.

The connected-object manager 2 includes:
  a receiver 20 for receiving data originating from at least one object connected to a communication network; and
  the information manager 3.

The communication architecture includes a broadcaster 4 for broadcasting multimedia data to at least one communication terminal of a user. The broadcaster 4 includes an emitter 42 for emitting, over a selected broadcasting channel, to at least one communication terminal of a user, a signal intended to be transmitted by the selected broadcasting channel, into which signal is integrated a piece of information generated on the basis of at least one datum originating from at least one connected object, the broadcasting channel having been selected depending on whether the broadcasting channel is being actively used by a communication terminal of a destination user.

The communication architecture in particular includes a generator 345 of signals $cd_{j\_}sgn$ to be broadcast, said generator being implemented in a server 5 of contents to be broadcast or a broadcaster 4.

FIGS. 3a to 3e illustrate simplified schematics of examples of use of an exemplary aspect of the present disclosure.

Figure 3A:
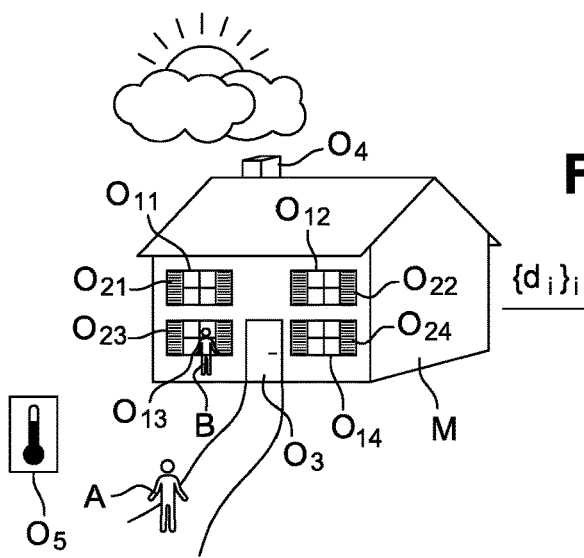
FIGS. 3a to 3e, simplified schematics of examples of use of an exemplary aspect of the present disclosure.

FIG. 3a illustrates a simplified schematic illustrating a network of domestic connected objects, which network is used by one embodiment of the disclosure.

In particular, a house M is equipped with a plurality of connected objects $O_{11} \ldots O_5$ that are associated with at least one user U (see FIG. 3b), for example one of the occupants of the house. These objects are connected, via a first communication network, in particular a low-power wireless network, to an object manager 2 (illustrated in FIG. 2) either directly because the object manager is implemented in the house, or indirectly via a second communication network, in particular the Internet, because the object manager is implemented remotely for example in the principal residence of the user U when the house M is a secondary residence or in the cloud, i.e. in a server of a service provider. The connected objects $O_{11} \ldots O_5$ send all or some of the data that they have collected and/or data generated from the collected data $\{di\}_i$ to one or more object managers 2.

FIG. 3a shows a few examples of connected objects:
- a network of window sensors $O_{11}, O_{12}, O_{13}, O_{14}, \ldots$ such as hinges with position sensors, openness detectors, etc.;
- a network of shutter sensors $O_{21}, O_{22}, O_{23}, O_{24}, \ldots$ such as hinges with position sensors, openness detectors, motors delivering their state and/or their last operation, etc.;
- a connected door $O_3$ delivering information relating to the state of the door (open, closed, locked, time it was last opened), to the identity of the last user of the door (occupant A entering, occupant B exiting), of a person present in front of the door, etc.;
- a manager $O_4$ of interior ambience such as heating, optionally reversible air-conditioning, etc. which delivers one or more measurements of the interior of the house, for example overall measurements or room-by-room measurements, such as of temperature, humidity, insolation, air quality, degree of ionization, etc.;
- temperature sensors, for example a weather sensor $O_5$ that is placed outside the house M and that delivers one or more measurements: temperature, humidity, pressure, etc., optionally the min and max measurements of the day, or a history of measurements in association with the current measurement;
- (not illustrated) presence sensors that sense the presence of intruders or permitted individuals (occupants A, B or friends, neighbors, etc.), which indicate the presence, the identity of the people present, the time range of presence, etc.;
- etc.

Figure 3B:
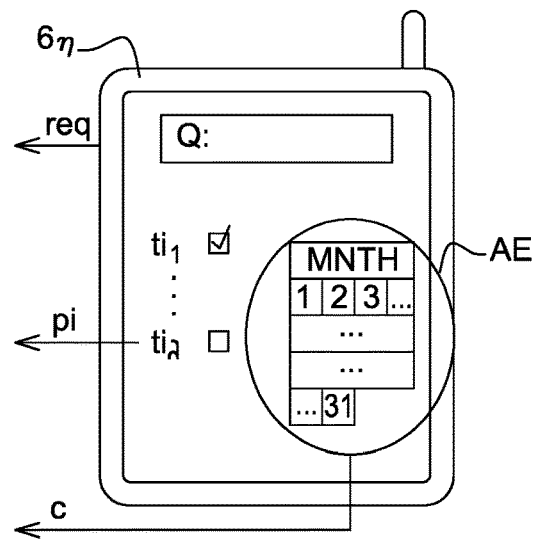

FIG. 3b illustrates a simplified schematic of one embodiment of a user interface in accordance with an aspect of the disclosure.

The user U may use a communication terminal 611 to interact with the information generator 231 that is implemented in the object manager 2 or the information manager 3 (which are illustrated in FIG. 2).

In particular, an information interface is implemented in the communication terminal $6_n$ allowing the user U to:
- either parameterize $p_i$ the information generator 231, for example by selecting, from a list, a type of information $ti_1 \ldots ti\lambda$, or by generating himself a new required type of information (not illustrated);
- or make a request req in particular in the form of a question Q.

The same communication terminal $6_n$ of the user and/or another communication terminal $6_1 \ldots 6_N$ of the user includes one or more processing devices such as an electronic organizer AE, a messaging service with location/contactability information (not illustrated), a user/presence detector for detecting the user (for example a video camera, a detector of an interaction such as a detector of a tap, etc.). The behavior analyzer 230 of the object manager 2 or of the information manager 3 receives or retrieves data $\{e_n\}_n$ relating to the user U from these processing devices AE thereby allowing it to determine a behavior c of use of broadcasting channels by the user, which is used by the selector 236, and/or a behavior c of use/consultation of the data of the connected objects, which is used by the information generator 231.

Figure 3C:
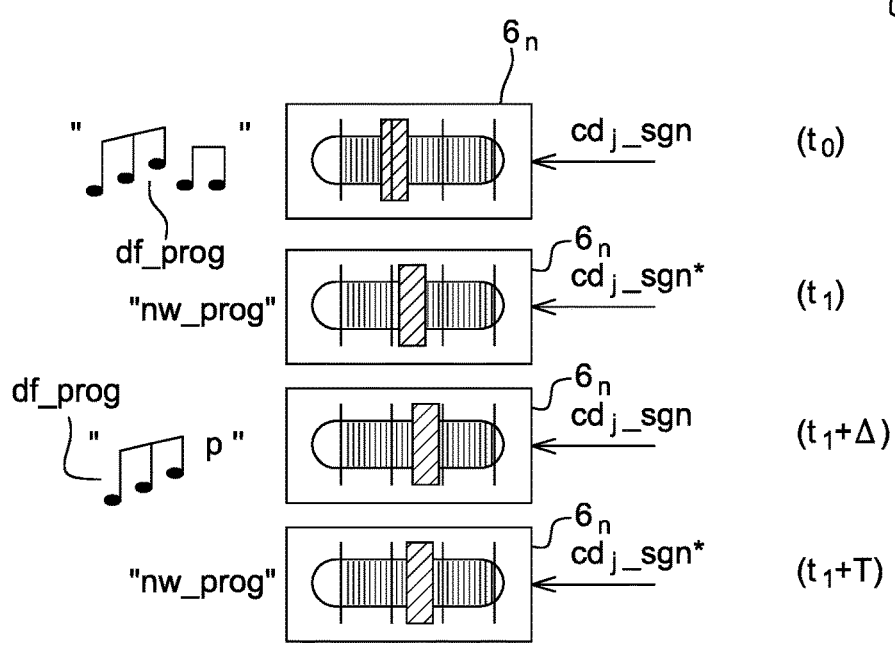

FIG. 3c illustrates a simplified schematic of a piece of radio-broadcast information.

At an initial time t0, the user U receives, on a communication terminal 6n, a signal $cd_j$_sgn via a broadcasting channel. The signal $cd_j$_sgn includes useful data df_prog that are reproduced by the communication terminal 6n, for example a radio program.

At this moment, occupant B of the house M illustrated in FIG. 3a enters into the house M. The door $O_3$ transmits a datum indicating that the door has been opened at t0, and the identity of B. At the same time, the ambience manager $O_4$ transmits its state (e.g. off) a temperature history (e.g. 20° (−1 h), 25° (t0)) and a degree of insolation of living areas (e.g. 100%).

The information generator 231 generates a piece of information i on the basis of these data: for example "B has come home. How would you like the heating of the house to be managed (25° rapidly increasing): By adjusting the air-conditioning? By adjusting openable fixtures (windows/shutters)? According to a pre-established program?".

Since the information manager 3 has detected that the user U is actively listening to the broadcasting channel cdj, it selects it for transmission of the generated piece of information i, which is integrated into the transmitted signal $cd_j$_sgn*.

Thus, at the time t1, the communication terminal 6n, which receives the signal $cd_j$_sgn* into which the piece of information i is integrated, over the selected broadcasting channel cdj, because it is being listened to by the user U, reproduces the piece of information converted into the form of an audio message nw_prog.

After the reproduction of the message nw_prog, the radio-broadcast program df_prog continues at a time t1+Δ.

Optionally, the user U may request to be informed periodically or the information manager may determine, from the behavior c of the user U, a periodicity with which to emit the piece of information i. Thus, at the time t1+T (T being the period of repetition of the piece of information i), the communication terminal 6n, which receives the signal $cd_j$_sgn* into which the piece of information i is integrated, over the selected broadcasting channel cdj, because it is being listened to by the user U, once again reproduces the piece of information converted into the form of an audio message nw_prog.

Figure 3D:
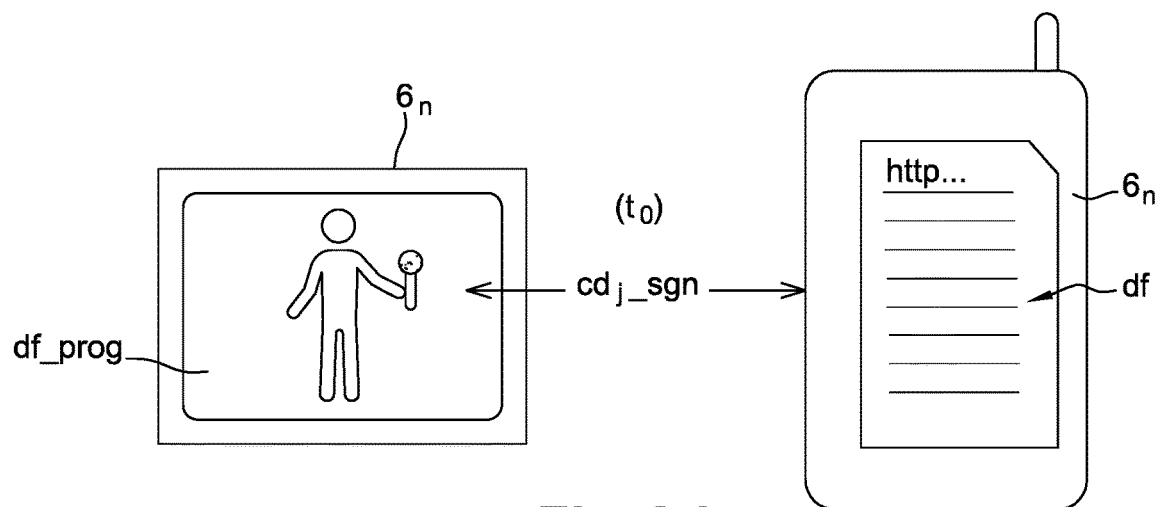

FIG. 3d illustrates a simplified schematic of a piece of TV-broadcast information.

At an initial time t0, the user U receives, on a communication terminal 6n, a signal $cd_j$_sgn via a broadcasting channel. The signal $cd_j$_sgn includes useful data df_prog that are reproduced by the communication terminal 6n, for example a television program, a series, a film, etc.

At this moment, occupant B of the house M illustrated in FIG. 3a enters into the house M. The door $O_3$ transmits a datum indicating that the door has been opened at t0, and the identity of B. At the same time, the ambience manager $O_4$ transmits its state (e.g. off) a temperature history (e.g. 20° (−1 h), 25° (t0)) and a degree of insolation of living areas (e.g. 100%).

The information generator 231 generates a piece of information i on the basis of these data: for example "animation illustrating the entry of B into the house and the temperature of the house (for example by means of a color chosen from a spectrum, in the present case red, and a written and/or audio message. How would you like the heating of the house to be managed (25° rapidly increasing): By adjusting the air-conditioning? By adjusting openable fixtures (windows/shutters)? According to a pre-established program?".

Since the information manager 3 has detected that the user U is actively watching the broadcasting channel cdj, it selects it for transmission of the generated piece of information i, which is integrated into the transmitted signal $cd_j\_sgn^*$.

Thus, at the time t1, the communication terminal 6n, which receives the signal $cd_j\_sgn^*$ into which the piece of information i is integrated, over the selected broadcasting channel cdj, because it is being watched by the user U, reproduces the piece of information converted into the form of a multimedia message nw_prog.

After the reproduction of the message nw_prog, the TV-broadcast program df_prog continues at a time t1+Δ.

Figure 3E:
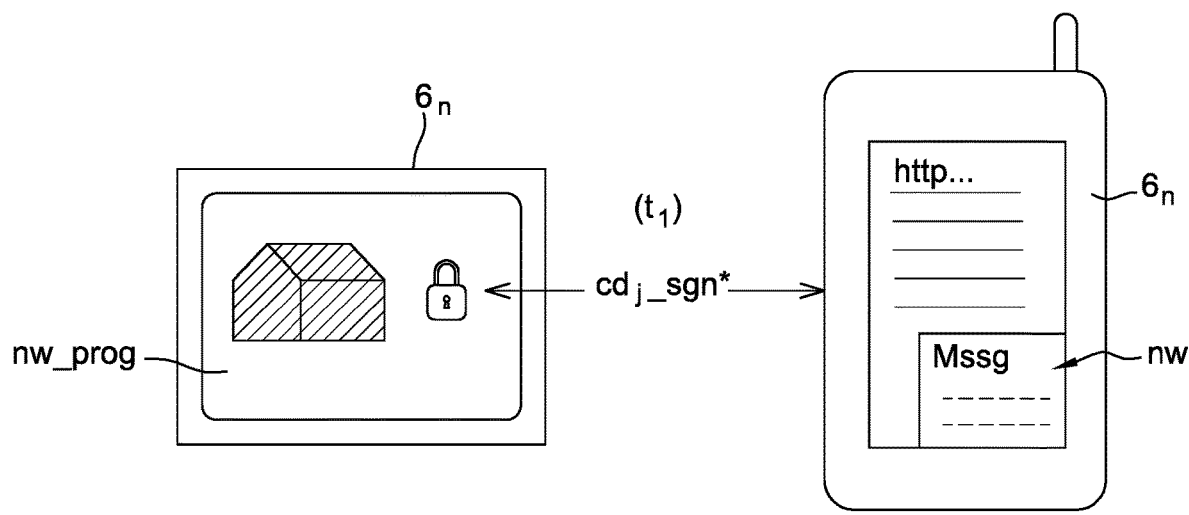

FIG. 3e illustrates a simplified schematic of a piece of information broadcast via instant message.

At an initial time t0, the user U receives, on a communication terminal 6n, a signal $cd_j\_sgn$ via a broadcasting channel. The signal $cd_j\_sgn$ includes useful data df_prog that are reproduced by the communication terminal 6n, for example an Internet site.

At this moment, occupant B of the house M illustrated in FIG. 3a enters into the house M. The door $O_3$ transmits a datum indicating that the door has been opened at t0, and the identity of B. At the same time, the ambience manager $O_4$ transmits its state (e.g. off) a temperature history (e.g. 20° (−1 h), 25° (t0)) and a degree of insolation of living areas (e.g. 100%).

The information generator 231 generates a piece of information i on the basis of these data: for example "B has come home. How would you like the heating of the house to be managed (25° rapidly increasing): By adjusting the air-conditioning? By adjusting openable fixtures (windows/shutters)? According to a pre-established program?".

Since the information manager 3 has detected that the user U is actively reading the website delivered by the broadcasting channel cdj, it selects it for transmission of the generated piece of information i in the form of an instant message in the transmitted signal $cd_j\_sgn^*$.

Thus, at the time t1, the communication terminal 6n, which receives the signal $cd_j\_sgn^*$ into which the piece of information i is integrated, over the selected broadcasting channel cdj, because it is being read by the user U, reproduces the piece of information converted into the form of a written message nw_prog.

After the reproduction of the message nw_prog, the radio-broadcast program df_prog continues at a time t1+Δ.

In various embodiments, the information-providing method operates on the standard principle of messages sent as information-highway traffic or over a standard radio/television network (in addition to existing messages) or in the form of messages replacing publicity slots or key moments (e.g. the end of songs, program signature tune, etc.).

The solution is in particular based on one or more of the following elements:
- a system for broadcasting information such as a digital radio, a digital television, etc.;
- systems for capturing data from a home network;
- systems for detecting user habits (e.g. geo-position of a communication terminal of the user, etc.);
- an ambient intelligence module that determines relevant information to be brought to the attention of the user and that is capable of generating reports, for example on the state of the house, of an individual (e-health), etc.;
- a module for broadcasting the information over a broadcasting channel, allowing the right moment for the broadcast to be determined, by means, for example, of:
  a system for detecting attention
  and/or a system for analyzing broadcast streams;
  and/or a converting module such as a module for synthesizing speech.

An exemplary advantage of an embodiment of the disclosure is that the channel used to broadcast the piece of information generated on the basis of data relating to the connected objects is a channel to which the user is already "paying attention" allowing him to carry out other tasks in parallel. In particular, the utilization of a mobile application as the interface illustrated by FIG. 3b allows information on personal habits to be capitalized upon.

More generally, aspects of the disclosure may be applied to:
- multimedia-based-chatbot or text-based-chatbot broadcasting means; and/or
- TV broadcasting means, via subtitles or complementary insertion of the broadcast piece of information.

Furthermore, the source of the data analyzed to generate IGEN the piece of information may extend beyond the house: smart-city sensors, etc.

The information may be broadcast over a channel specific to an operator and/or to an Internet radio-broadcast application such as Orange Radio and/or at the end of a program and/or regularly (every hour) and/or during a program (in particular urgent information: fire alarm or information parameterized as urgent: return home of a child) and optionally include data from domestic sensors not relating to the house M: information of the presence, in the house, in particular of children (returned home from school for example) generated by a connected-object manager associated with a house, such as the service Orange HomeLive (registered trademark).

An exemplary embodiment of the present disclosure also relates to a medium. The information medium may be any entity or device capable of storing the program. For example, the medium may include a storage means, such as a ROM, for example a CD-ROM or a microelectronic-circuit ROM or even a magnetic recording means, for example a floppy disk or a hard disk.

However, the information medium may be a transmissible medium such as an optical or electrical signal that may be routed via an optical or electrical cable, by radio or by other means. The program according to an exemplary embodiment of the present disclosure may in particular be downloaded over a network, in particular the Internet.

Alternatively, the information medium may be an integrated circuit into which the program is incorporated, the circuit being suitable for executing or for being used in the execution of the method in question.

In another implementation, an exemplary embodiment of the present disclosure is implemented by means of software and/or hardware components. Thus, the term module may correspond equally to a software component or to a hardware component. A software component corresponds to one or more computer programs, to one or more sub-programs of a program, or, more generally, to any element of a program or of a software package suitable for implementing a function or a set of functions according to the above description. A hardware component corresponds to any element of a hardware assembly able to implement a function or a set of functions.

Although the present disclosure has been described with reference to one or more examples, workers skilled in the art will recognize that changes may be made in form and detail without departing from the scope of the disclosure and/or the appended claims.

The invention claimed is:

1. A method for providing information to a destination user of a communication terminal, said information being based on data relating to at least one object connected to a communication network and associated with the destination user, the method comprising the following acts performed by an information manager device:
   receiving at least one datum originating from the at least one object associated with the destination user;
   obtaining data representative of a broadcasting channel actively used by the communication terminal of the destination user;
   selecting a broadcasting channel from among several broadcasting channels the communication terminal is able to use, the selected broadcasting channel being selected depending on the obtained data representative of the broadcasting channel actively used by the communication terminal;
   generating a piece of information formatted to be reproduced by the communication terminal and depending:
      on the at least one datum originating from the at least one connected object; and
      on a behavior of the communication terminal and/or a request by the communication terminal relating to the at least one datum; and
   integrating the generated piece of information into useful data of a signal in the process of being transmitted via the selected broadcasting channel that is actively used by the communication terminal.

2. The method according to claim 1, wherein the method includes analyzing behavior of the communication terminal of the destination user, the analyzed behavior being used, by the act of selecting, to determine whether one or more broadcasting channels are being actively used by the communication terminal of the destination user.

3. The method according to claim 1, wherein the method includes predicting, depending on at least one behavior of the destination user, whether a broadcasting channel among the several broadcasting channels will be actively used by the communication terminal of the destination user at a given time at which the generated piece of information is to be broadcast.

4. The method according to claim 1, wherein the method includes generating a piece of information to be broadcast depending:
   on the at least one datum originating from the at least one connected object; and
   on the behavior of the communication terminal of the destination user.

5. The method according to claim 4, wherein the method includes generating the piece of information to be broadcast depending:
   on the at least one datum originating from the at least one connected object; and
   on a request by the communication terminal of the destination user.

6. The method according to claim 1, wherein the method includes converting the generated piece of information into a format compatible with the selected broadcasting channel, the resulting converted piece of information being able to be integrated into useful data of the signal in the process of being broadcast.

7. A method for broadcasting, to a communication terminal of a destination user, a signal based on data relating to at least one object connected to a communication network and associated with the destination user, the method comprising the following acts performed by a broadcasting device:
   obtaining a piece of information formatted to be reproduced by the communication terminal and generated on the basis of:
      at least one datum originating from the at least one connected object; and
      a behavior of the communication terminal and/or a request by the communication terminal relating to the at least one datum;
   integrating the piece of information into useful data of a signal for broadcast to the communication terminal of the destination user over a broadcasting channel that is selected from among several broadcasting channels the communication terminal is able to use depending on the selected broadcasting channel being actively used by the communication terminal; and
   broadcasting the signal with the integrated piece of information to the communication terminal over the selected broadcasting channel.

8. The method according to the claim 7, wherein generating a piece of information depends:
   on the at least one datum originating from the at least one connected object; and
   on the behavior of the communication terminal.

9. The method according to claim 7, wherein the integrating includes at least one of the following steps:
   adding the generated piece of information to useful data of the signal;
   in at least one predefined time range, substituting the generated piece of information for useful data of the signal;
   substituting the generated piece of information for predefined useful data of the signal.

10. The method according to claim 9, wherein the method includes converting the generated piece of information into a format compatible with the selected broadcasting channel, the resulting converted piece of information being able to be integrated into useful data of a signal in the process of being broadcast.

11. The method according to claim 7, wherein the selected broadcasting channel is a broadcasting channel of at least one of the following types:
   a radio broadcasting channel;
   a television broadcasting channel;
   an instant-message broadcasting channel;
   a broadcasting channel dedicated to the broadcast of at least one piece of information generated on the basis of data relating to a connected object.

12. The method according to claim 7, wherein generating the piece of information to be broadcast depends:
   on the at least one datum originating from the at least one connected object; and
   on a request by the communication terminal of the destination user.

13. A non-transitory computer-readable medium comprising a program stored thereon, which comprises program-code instructions for executing a method of providing information to a destination user of a communication terminal, when said program is executed by a processor, wherein the information is based on data relating to at least one object connected to a communication network and associated with the destination user, the method comprising:
   receiving at least one datum originating from the at least one object associated with the destination user;

obtaining data representative of a broadcasting channel actively used by the communication terminal of the destination user;

selecting a broadcasting channel from among several broadcasting channels the communication terminal is able to use, the selected broadcasting channel being selected depending on the obtained data representative of the broadcasting channel actively used by the communication terminal;

generating a piece of information formatted to be reproduced by the communication terminal and depending:
  on the at least one datum originating from the at least one connected object; and
  on a behavior of the communication terminal and/or a request by the communication terminal relating to the at least one datum; and integrating the generated piece of information into useful data of a signal in the process of being transmitted via the selected broadcasting channel that is actively used by the communication terminal.

14. An information manager device for managing information provided to a communication terminal of a destination user depending on data relating to at least one object connected to a communication network and associated with the destination user, the information manager device comprising:
  a processor; and
  a non-transitory computer-readable medium comprising instructions stored thereon which when executed by the processor configure the information manager device to:
  receive at least one datum originating from the at least one object associated with the destination user;
  obtain data representative of a broadcasting channel actively used by the communication terminal of the destination user;
  select a broadcasting channel from among several broadcasting channels the communication terminal is able to use, the selected broadcasting channel being selected depending on the obtained data representative of the broadcasting channel actively used by the communication terminal;
  generate a piece of information formatted to be reproduced by the communication terminal and depending:
    on the at least one datum originating from the at least one connected object; and
    on a behavior of the communication terminal and/or a request by the communication terminal relating to the at least one datum; and
  integrate the generated piece of information into useful data of a signal in the process of being transmitted via the selected broadcasting channel that is actively used by the communication terminal.

15. The information manager device according to claim 14, further comprising:
  a receiver, configured to receive the at least one datum originating from the at least one object connected to the communication network.

16. A broadcaster device, which broadcasts multimedia data to at least one communication terminal of a destination user, the broadcaster device comprising:
  a processor; and
  a non-transitory computer-readable medium comprising instructions stored thereon which when executed by the processor configure the broadcaster device to broadcast to the at least one communication terminal a signal based on data relating to at least one object connected to a communication network and associated with the destination user, the broadcasting comprising:
  obtaining a piece of information formatted to be reproduced by the communication terminal and generated on the basis of:
    at least one datum originating from the at least one connected object; and
    a behavior of the communication terminal and/or a request by the communication terminal relating to the at least one datum;
  integrating the piece of information into useful data of a signal for broadcast to the communication terminal of the destination user over a broadcasting channel that is selected from among several broadcasting channels the communication terminal is able to use depending on the selected broadcasting channel being actively used by the communication terminal; and
  broadcasting the signal with the integrated piece of information to the communication terminal over the selected broadcasting channel.

17. A non-transitory computer-readable medium comprising a program stored thereon, which comprises program-code instructions for executing a method of broadcasting, to a communication terminal of a destination user, a signal based on data relating to at least one object connected to a communication network and associated with the destination user, when said program is executed by a processor, the method comprising:
  obtaining a piece of information formatted to be reproduced by the communication terminal and generated on the basis of:
    at least one datum originating from the at least one connected object; and
    a behavior of the communication terminal and/or a request by the communication terminal relating to the at least one datum;
  integrating the piece of information into useful data of a signal for broadcast to the communication terminal of the destination user over a broadcasting channel that is selected from among several broadcasting channels the communication terminal is able to use depending on the selected broadcasting channel being actively used by the communication terminal; and
  broadcasting the signal with the integrated piece of information to the communication terminal over the selected broadcasting channel.

* * * * *